Figure 6:
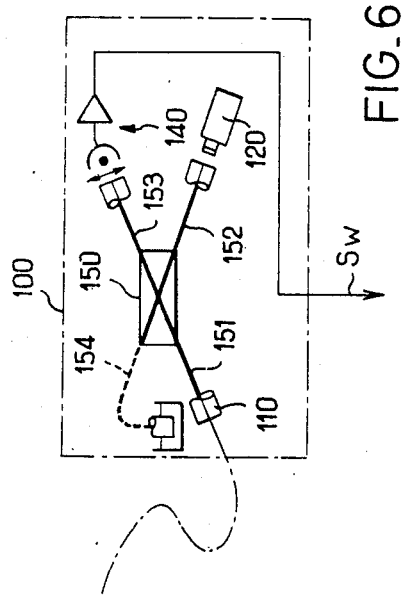

United States Patent [19]

Crosnier et al.

[11] Patent Number: 4,815,811
[45] Date of Patent: Mar. 28, 1989

[54] METHOD AND APPARATUS FOR POSITIONING AND FIXING AN OPTIC FIBRE TERMINATION IN A CONNECTOR, A CONNECTION TERMINAL AND AN OPTIC CONNECTOR

[75] Inventors: Jean-Jacques Crosnier, Fontenay-aux-Roses; Michel de Mendez, Montlery; Joël Maurin, Paris, all of France

[73] Assignee: Sourtau & Cie, Boulogne Billancourt, France

[21] Appl. No.: 5,770

[22] Filed: Jan. 21, 1987

[30] Foreign Application Priority Data

Jan. 24, 1986 [FR] France .................... 86 01016

[51] Int. Cl.⁴ .................... G02B 6/36; G01N 21/00
[52] U.S. Cl. .................... 350/96.20; 356/73.1
[58] Field of Search .................... 350/96.20; 356/73.1, 356/153

[56] References Cited

U.S. PATENT DOCUMENTS 4,673,245 6/1987 Kling et al. .................... 350/96.20

FOREIGN PATENT DOCUMENTS

| 0129456 | 10/1983 | European Pat. Off. . |
| 2654537 | 2/1976 | Fed. Rep. of Germany . |
| 2506930 | 6/1981 | France . |
| 2516648 | 6/1981 | France . |
| 2564985 | 5/1984 | France . |
| 5669608 | 8/1981 | Japan . |

*Primary Examiner*—Gene Wan
*Attorney, Agent, or Firm*—Nixon & Vanderhye

[57] ABSTRACT

The invention has the object of providing an optic contact, that is to say the positioning and fixing of a termination (5) of an optic fibre in a connection terminal (4). According to the invention: the termination is inserted in the terminal in a manner to allow the termination a transverse play in the terminal; an optic signal is axially injected (120,110) into the core of the fibre through the end face (6) of the termination; the signal returned through this same end face is detected (110,130,140) on a point of this latter corresponding to a predetermined reference axis; the termination is displaced transversely (210,220; 210',220') in the terminal with respect to the reference axis as far as a position at which the amplitude of detected signal (S$w$) is a maximum, so that this position corresponds to an alignment of the axis of the core of the fibre on this reference axis; the termination is fixed in this position in the terminal.

15 Claims, 3 Drawing Sheets

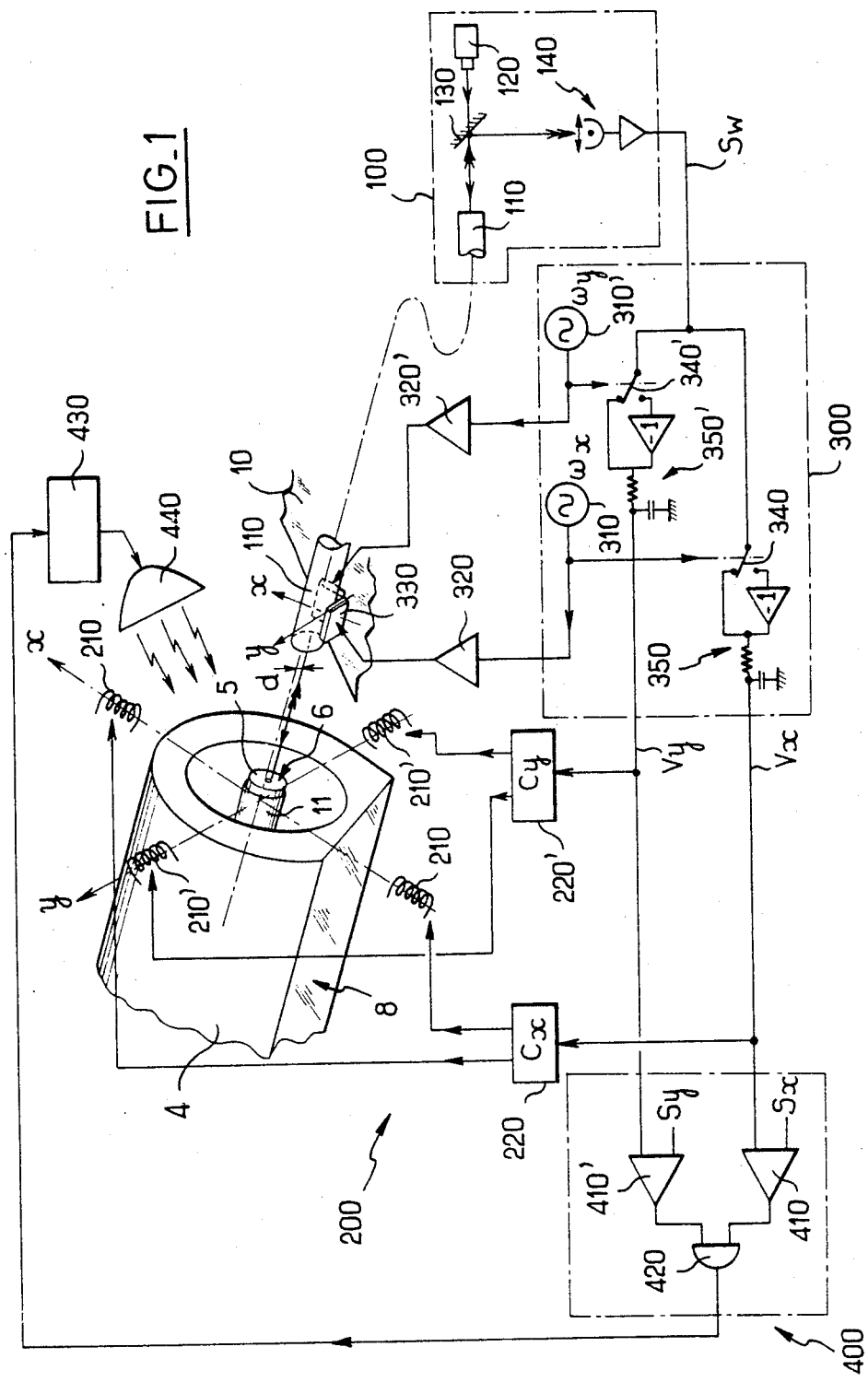
FIG_1

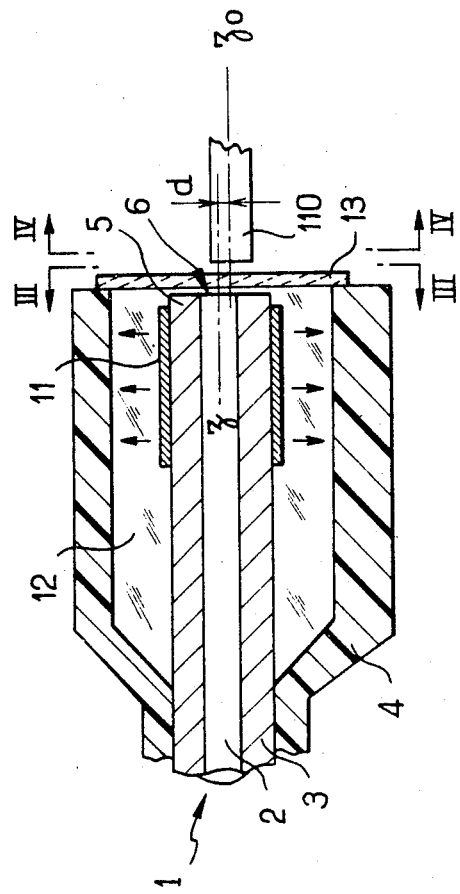
FIG_2
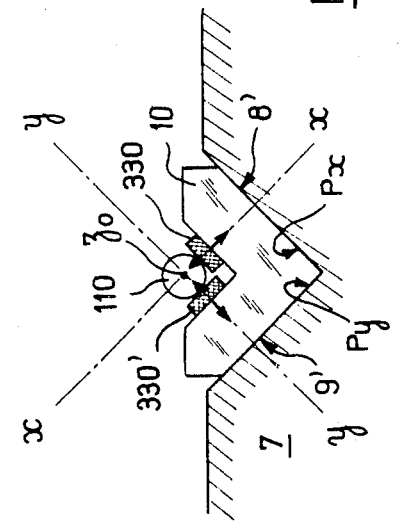
FIG_4
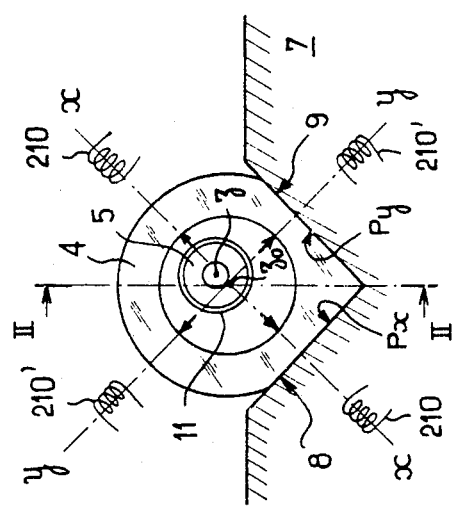
FIG_3

METHOD AND APPARATUS FOR POSITIONING AND FIXING AN OPTIC FIBRE TERMINATION IN A CONNECTOR, A CONNECTION TERMINAL AND AN OPTIC CONNECTOR

FIELD OF THE INVENTION

The present invention relates to a method and apparatus for positioning and fixing an optic fibre termination in a connection terminal, as well as a connection terminal and an optical connector produced by this method.

BACKGROUND OF THE INVENTION

It concerns the production of an "optic contact" at the end of a fibre, that is to say to provide this end with a connection terminal which will then be introduced into different types of connectors. In particular, for the connection of two fibres between themselves, the respective two optic contacts as provided will be joined in a common base having two female positions opposite each other receiving the terminals and permitting the bringing into contact of the end faces of the fibres.

The problem posed by the connection of two optic fibres consists essentially of bringing into coincidence the optic axes of the cores of these, for obtaining the lowest possible transfer loss.

In the case of a connection by joining of two optic contacts, it concerns the preparation individually of each fibre termination with an optimal centering of the core of the fibre on a reference axis of the terminal. If the cores are perfectly centered in the terminals, then alignment faults will result only from mechanical tolerances of the terminal and of the base and from residual play between the elements, faults which can be reduced to very low values (of the order of 0.2 to 0.3 $\mu$m) with the better technologies presently available.

The difficulty comes from the fact that it in fact concerns the alignment of two fictional axes, not materialised, and that the alignment of optic sheaths which surround the cores of the two fibres does not necessarily provide the alignment of the cores, insofar as a slight eccentricity always exists in practice between the core and the optic sheath of a given fibre.

This inconvenience is not particularly awkward in the case of multimode fibres, that is to say of fibres of which the diameter of the core is much greater than the wavelength propagated; for example for a 50/125 fibre (diameter of the core 50 $\mu$m and the diameter of the optic sheath 125 $\mu$m), a misalignment of the cores of 3 $\mu$m producing a transfer loss of approximately 0.5 dB.

On the contrary, in the case of monomode fibres (that is to say having a diameter of core (for a fibre with an index step) or an equivalent diameter of core (for a fibre with an index gradient) of the same order of size as the propagated wavelength), for arriving at the same value of transfer loss, it is necessary to attain a precision of alignment of the order of 0.3 $\mu$m.

Now no present fabrication of monomode fibres guarantees such concentricity between the axis of the core and the external surface of the optic sheath; values of tolerance generally observed are of the order of $+1$ to 5 $\mu$m.

The solutions proposed up to now for centering with precision a termination of an optic fibre in a connection terminal - particularly in the case of a monomode fibre - provide injection of light into the fibre, either through the other end of the fibre, or through a region close to the end to be connected, which is curved for injection of an optic signal. After transmission through the fibre, the signal is observed through a microscopic viewer, and the termination of the fibre is micromanipulated by the operator until optimal centering is obtained of the luminous spot (corresponding to the core of the fibre) on the reticle of the viewing system.

These known methods of centering have however a certain number of inconveniences, in particular the fact that the quality of the manipulation depends upon the dexterity of the operator.

Further, for opperating the first method (injection from the other end), the connector has to be mounted in a laboratory or in a factory dedicated to the production of fibres, and a splicing on site of the fibre as such will be necessary.

In the case of the second method, the necessity of injecting an optic signal whilst curving the fibre creates the risk of the application of excessive stresses in the fibre; further, it is necesary to lay this bare in the case where it is provided with an opaque mechanical sheathing covering the optic sheath. Further, precise work on the ground is always made difficult because of the poor accessability of elements, ambient pollution, and bad conditions of work, or the like.

THE INVENTION

One of the objects of the invention is to resolve these difficulties, in proposing a method of positioning of the optic fibre termination in a connection terminal, which does not necessitate operation on any part other than the end of the optic fibre for injecting and transmitting an optic signal, and which permits a centering with a very great precision and without involving any personal factor of a judgement by the operator.

Of course the invention is applicable very advantageously to the alignment of monomode fibres, and it can very well be used with advantage for multimode fibres, thanks to the higher precision and to the great facility of manipulation which it brings about.

For this, the method of the invention consists in:

inserting the termination in the terminal in a manner to allow the termination a transverse play inside the terminal, axially directing an optic signal onto an end face of the termination so as to be injected into the core of the fibre an optic signal through the end face of the termination, detecting the signal travelling returned through the same end face, at a point of this corresponding to a predetermined reference axis, transversely displacing the termination in the terminal with respect to the reference axis, in at least one direction, to a position at which the amplitude of signal detected—or the component of the detected signal representative of the position of the termination of the fibre—passes through an extreme, so that this position corresponds to an alignment of the axis of the core of the fibre on the reference axis, and fixing the termination in this position in the terminal.

It can be stated that, insofar as the optic signal is now injected from upstream of the terminal, it is no longer necessary to curve the fibre behind the terminal (with possible laying bare), or any other analagous operation, whilst there is no longer transmission of an optic signal along the length of the fibre, but only a detection of the signal returned at the end where this is injected.

The signal returned through the end fibre results from the combination of several optical phenomena, principally surface reflection from the end surface (Fresnel retroreflection), the reflection from deep in the fibre (a phenomenon known as retrodiffusion, in particular Rayleigh diffusion), and, in the case where the detection of the signal is effected by an optic fibre detector, coupling of modes of propagation between the fibre to be centered and the detector fibre.

Advantageously, further:

at the same time as the optic signal is injected, it is modulated in amplitude, and the received signal is demodulated, in a manner to obtain a continuous measurement value representative of the amplitude representative of the signal returned through the fibre.

In a first embodiment, the modulation is a geometric modulation, that is to say a modulation of the distance between the fibre to be centered and the detector fibre; in this case, the optic signal is modulated under the effect of at least a transverse vibration having a component parallel to the direction of displacement, this vibration alternatingly extending and returning parallel to both the axis of the core and the reference axis.

Respective operations of centering of the fibre according to the two directions corresponding to the two degrees of freedom of this can be carried out either successively, or simultaneously.

It is possible, in this latter case, to submit the optic signal to a double modulation under the effect of two simultaneous transverse vibrations, produced at two different frequencies and not harmonic of each other.

In the case of a second embodiment, the modulation of the optic signal is simply an optic modulation of the power of the beam of the device for injecting the optic signal into the fibre, for example by use of a source of pulsed light, or modulation by interposition in the beam of an electro-optic cell, or any other analagous means.

The demodulation is preferably a synchronous demodulation effected at the frequency of modulation of the optic signal, which permits particularly a reduction of the signal to noise ratio for the detected signal.

Preferably:

there is provided a preliminary stage consisting of fixing at the free end of the termination a ferrule of ferromagnetic material, and the termination is suspended and displaced by magnetic suspension of the ferrule under the effect of magnetic fields applied from outside the terminal.

In this case, the magnetic suspension can advantageously be controlled from the amplitude of the detected signal, in a manner to displace the termination in the direction producing an increase of this amplitude.

The fixing of the termination in the terminal can be carried out by hardening of a glue filling the free space existing in the terminal around the termination. The presence of the glue at this point permits in addition, prior to hardening, the assurance of a certain damping in avoiding very quick displacements of the termination of the fibre, which is particularly significant in the case of magnetic suspension.

A glue can be used of which the hardening is caused by an irradiation with ultra-violet light, this irradiation being triggered when the amplitude of the detected signal attains its maximum value.

The invention also relates to an apparatus for putting into effect the method.

This apparatus comprises:

optic and electronic means, for axially injecting into the core of the fibre an optic signal from the end face of the termination and detecting the signal returned by this same end face, at a point of this corresponding to a predetermined reference axis, and micromanipulation means, for transversely displacing the termination in the terminal with respect to the reference axis, in at least one direction, to a position in which the amplitude of the detected signal is a maximum, so that this position corresponds to an alignment of the axis of the core of the fibre on this reference axis.

Advantageously there is further provided:

means for modulating the amplitude of the optic signal, and means for demodulating the detected optic signal, in a manner to obtain a continuous measurement value representative of the amplitude of the signal returned through the fibre.

There can also be provided means for modulating the optic signal under the effect of at least one transverse vibration having a component parallel to the direction of displacement, this vibration alternatingly extending and returning, parallel to both the axis of the core and the reference axis.

The means for detecting the return signal can comprise a semi-reflective element (a semi-reflective blade, separator prism, or the like), or even an optic fibre detector comprising an optic coupler (an optic fibre detector is a device analysing the retroreflection produced by an obstacle situated opposite the end face of an optic fibre; this optic fibre is connected, at its other end, to a luminous source and to a photo-cell delivering an electric signal varying as a function of the rate of retroreflection. This type of detector is already used, particularly, as a proximity detector and measurer.)

THE DRAWINGS

Figure 7:
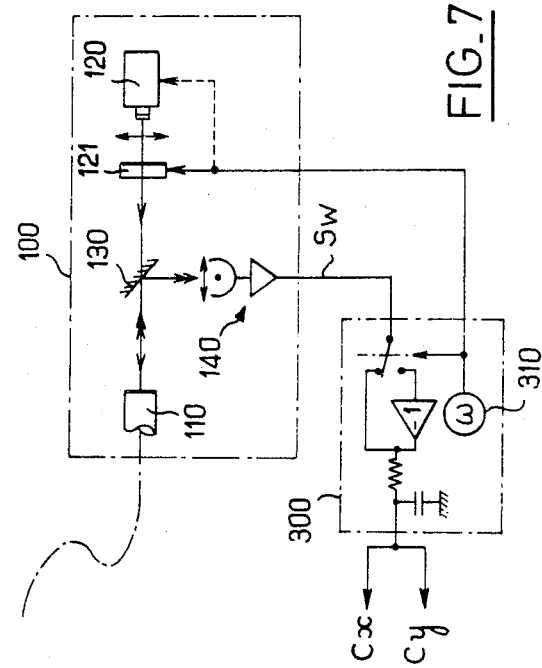
Figure 5:
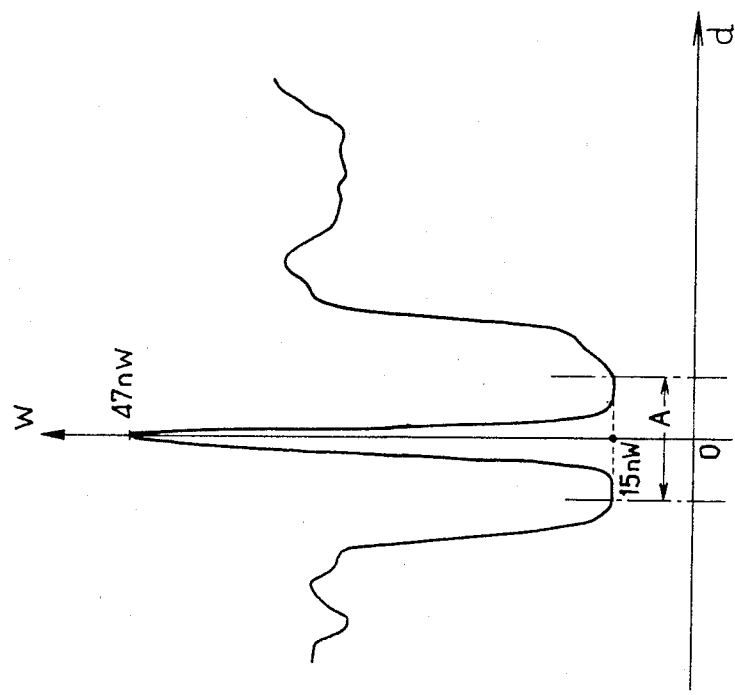

Other characteristics and advantages of the invention will appear from reading the detailed description below, with reference to the accompanying drawings, in which:

FIG. 1 schematically shows the assembly of elements concerning the invention, with associated electronic control circuits, FIG. 2 is a cross-sectional view, on the line II—II of FIG. 3, of the termination of the fibre placed in its terminal, FIG. 3 is an end view of the fibre and of the terminal, on the direction III—III in FIG. 2, FIG. 4 is an end view, on the direction IV—IV in FIG. 2, FIG. 5 shows detected variations of the optic signal as a function of variable misalignment of the axis of the core and the reference axis, FIG. 6 shows a variant, using a fibre detector comprising an optic coupler, and FIG. 7 shows another variant, in which the modulation of the injected signal is an optic modulation of the power of the emitted beam.

In FIGS. 1 to 4, the reference 1 designates the optic fibre, comprising a core 2 and an optic sheath 3 centered inside the terminal 4 (it can either be a fibre with an index step or a fibre with an index gradient; in this latter case, one will understand as diameter of the core the diameter of the equivalent core). The terminal 4 has an internal diameter greater than the diameter of the fibre, so that the termination 5 of this has a transverse play inside the terminal, with two degrees of freedom. It will be understood that the displacements of the termination of the fibre are so small that the fibre can be considered as displacing parallel to itself, without angular displacement.

The object of the manipulation is to align the axis z of the core of the termination of the fibre on a reference axis $z_o$, whilst applying an optic signal through the end face 6 of the termination of the fibre, and analysing the signal returned at this same point.

The axis $z_o$ is geometrically defined, for example with respect to two reference surfaces 8,9 (FIG. 3) of the terminal. In effect, if one can perfectly align the axis of the core on a predetermined position with respect to the reference faces of the terminal, an alignment of two fibres can be obtained by putting two terminals face to face and abutting these in a common support having a V groove homologous with the two faces 8 and 9 of each of the two terminals placed opposite each other. Present techniques permit production by such means of an alignment of the two axes $z_o$ of each of the terminals close to 0.2 μm. It can be seen that, if the axis z can be aligned on the axis $z_o$ defined with respect to the terminal, a "transfer of precision" is arranged so that the only precision necessary is the mechanical precision of alignment of the terminals - which can be very great -, with the result that the core of the fibre is perfectly centered inside the terminal.

For proceeding to this centering, one uses a support 7 (FIGS. 3 and 4) provided with two reference planes $P_x$ and $P_y$ on which rest on the one hand (FIG. 3) the faces 8 and 9 of the terminal and, on the other hand, (FIG. 4) homologous faces 8' and 9' of a block 10 machined with very great precision (for example a quartz block) receiving an optic device, for example the fibre 110 of an optic fibre detector, this fibre having its core perfectly centered in a manner to define with the greatest possible precision the reference axis $z_o$ with respect to the reference planes $P_x$ and $P_y$.

For injecting the optic signal into the termination of the fibre and analysing the signal returned, there is provided a device 100, which is for example a fibre optic detector of known type, as for example the SOURIAU model 80 84 CP or any other analogous detector. This device comprises, opposite the fibre 110, a luminous source 120, of which the wavelength is, in the case of a monomode fibre to be aligned, of the same order of wavelength for which the fibre is provided, or even can be less than this value (for example a wavelength of 0.85 μm for monomode fibres operating at 1.3 or 1.5 μm); it can also be a helium-neon laser source. Further, the beam can, instead of being propagated in a fibre, propagate in free space.

A semi-reflecting blade 130 is interposed between the fibre 110 and the source 120, for directing the return signal towards a detector 140 producing, after amplification, a signal $S_W$ proportional to the intensity of the signal returned through the end face of the termination of the fibre to be aligned.

There is provided means for micromanipulation 200 for displacing the termination of the fibre inside the terminal in a manner to maximise the signal $S_W$.

In the example illustrated, means are shown for forming an electromagnetic suspension comprising two pairs of windings 210 and 210', arranged on two orthogonal axes x,y (FIG. 3) controlled by circuits 220,220' and acting on a ferrule 11 of electromagnetic material (soft iron, nickel, or the like) preliminarily fixed at the free end of the termination of the fibre, for example by glueing or crimping.

In this case, a terminal will be chosen of plastic material (which is in any case the most frequently employed material) as a result of its "transparence" to magnetic fields.

The optic signal injected into the core of the fibre via the end face 6 is further, preferably, modulated in amplitude, the received signal $S_W$ being then demodulated by a circuit 300.

In the embodiment illustrated in FIGS. 1 to 4, the modulation is a geometric modulation, obtained by transversely vibrating the fibre 110 around the axis $z_o$ in two orthogonal directions x and y, preferably not the same as the direction of gravity.

This vibration is for example obtained by means of piezoelectric supports 330,330' (FIG. 4) interposed between the fibre 110 and the block 10, these two quartzes being able to be replaced by a single quartz excited in an appropriate manner according to two distinct transverse modes.

The quartzes 330,330' are excited at frequencies $\omega_x$ and $\omega_y$, not equal and not harmonics of each other, produced by oscillators 310,310' controlling the power circuits 320,320'.

The demodulator 300 is advantageously a synchronous demodulator controlled by the same oscillators $\omega_x$ and $\omega_y$ producing the modulation of the signal. Schematically, a synchronous demodulator comprises a bistable commutator 340,340', triggering in phase with the modulation frequency, between two contacts corresponding to a direct transmission of the signal and to an inverse transmission of this; at the output, an integrator stage 350,350' arranged so that the mean voltage $V_x, V_y$ delivered is proportional to the amplitude of the component to the frequency $\omega_x$, $\omega_y$, respectively, of the signal $S_W$ applied to the demodulator. In the case of this Figure, the synchronous modulation/demodulation permits at once reduction of the signal to noise ratio, elimination of the continuous component of the signal $S_W$ (which is of no interest, because one is interested only in variations of this signal), and of amplification of the alternating component to the frequency of modulation and to this sole frequency, whilst freeing the signals of all neighbouring frequencies, including multiples and fractions of the frequency of modulation.

Advantageously, the signals $V_x$ and $V_y$ are transmitted to the control circuits 220,220', in a manner to produce a control loop which automatically centers the termination of the fibre on the position which gives the returned optic signal the greatest amplitude. For fixing the fibre at this optimum position, one can provide various means.

One possibility consists of filling the free space 12 (FIG. 2) existing inside the terminal with a glue hardenable by exposure to ultra-violet light; the terminal 4 is for example closed by a transparent block of glass 13 for avoiding running away of the glue.

The hardening of the glue can be controlled automatically by a device 400 receiving the signals $V_x$ and $V_y$ from the demodulator and comparing them, by comparators 410,410', to thresholds $S_x$ and $S_y$. When one or other thresholds is exceeded, a signal appears at the output of the gate AND 420, which triggers a control circuit 430 for a light lamp 440 positioned close to the terminal, in a manner to irradiate the glue and cause its hardening.

FIG. 5 shows the variation of the power W of the signal returned through the end faces of the fibre as a function of misalignment d from the axes z and $z_o$. The only significant region is the region A, the climb of returned power beyond this zone being essentially due to parasitic phenomena of retroreflection on the optic sheath of the fibre, on peripheral regions, the glue, or the like. As can be stated, the marked characteristic is the variation of the signal which permits a precise centering of the core of the fibre.

Variants

FIG. 6 shows a variant of the device 100, in which the semi-reflecting blade 130 is replaced by an optic coupler 150.

Optic couplers are known, which are devices formed from two fibres twisted onto each other with fusion of the central part, or by splicing of an end of one fibre onto the curved part of another fibre. These couplers are designated "X couplers" or "Y couplers" according to whether they have four or three branches, respectively. Appropriate couplers are, for example, models CLTO 4053, 4056 or 4060 produced by the Compagnie Lyonnaise de Transmissions Optiques, which are X couplers for 50/125 fibres, or the model CLTO 4054, which is a Y coupler for 50/125 fibres; other models of couplers exist for all types of fibres, monomode or multimode; one can mention particularly as monomode couplers, models SM4C (an X coupler) and SM3C (a Y coupler) produced by the CANSTAR company.

The two opposite arms 151,153 of the coupler correspond to the fibre 110, the circuit detector 140 being placed opposite the branch 153. The luminous emission device 120 is placed opposite the end of the branch 152. As to the branch 154, which is optional, (it exists only in the case of an X coupler), it is provided to make a branch with complete absorption (for example by dipping its end in a vessel containing a liquid with a compatable index), for eliminating any noise wave.

In FIG. 7, a variant is shown in which the modulation is no longer a geometric modulation (vibration impressed on the fibre 110), but an optic modulation, for example impulsive, of the power of the beam delivered from the luminous emission device 120. This modulation can be produced by interposition of an electromechanic system 121 (for example a rotary disc) controlled by the oscillator 310; it can also be provided by using a pulsed emitter, the pulses being in this case triggered by the mentioned oscillator 310.

In another variant, it is possible to combine the optic modulation of the power of the beam illustrated by FIG. 7 with a fibre optic detector comprising an optic coupler, as illustrated in FIG. 6.

Finally, in the case of the different embodiments shown, it can be desirable to add between the two fibres (the fibre to be centered and the detection fibre) a drop of index liquid in a manner to increase the sensitivity of detection and diminish the losses of light energy.

We claim:

1. An apparatus for positioning a termination of an optic fibre in a connection terminal, said apparatus comprising:
    optic and electronic means for directing an optic signal into an end face of said termination so as to axially inject into a core of said fibre, said optic signal through said end face of said termination and for detecting a signal returned through said end face, at a point corresponding to a predetermined reference axis, and
    micromanipulation means, for transversely displacing said termination in said terminal with respect to said reference axis, in at least one direction, to a position in which the amplitude of said detected signal is a maximum, so that this position corresponds to an alignment of an axis of said core of said fibre on said reference axis.

2. An apparatus according to claim 1, in which there is further provided:
    means for modulating said amplitude of said optic signal, and
    means for demodulating said detected optic signal, in a manner to obtain a continuous measurement value representative of said amplitude of said signal returned by said fibre.

3. An apparatus according to claim 1, in which there is further provided means for modulating said optic signal by at least one transverse vibration having a component parallel to a direction of displacement, said vibration alternatingly extending and returning parallel to both said axis of said core and said reference axis.

4. An apparatus according to claim 1, in which said means for detecting said returned signal comprises a semireflecting element.

5. An apparatus according to claim 1, in which said means for detecting said returned signal comprises a fibre optic detector having an optic coupler.

6. An apparatus for aligning a termination of an optical fibre within a connection terminal having an alignment axis ($z_o$), said optical fiber termination including an end face, said apparatus comprising:
    a connection terminal including means defining an aperture into which aperture said optical fiber is placed, said terminal aperture defining means having a dimension larger than a diameter of said termination of said optical fiber;
    means for directing an optical signal onto said end face;
    means for detecting a signal returned from said end face;
    means for transversely displacing said termination in said aperture in a given direction; and
    means, responsive to said detecting means, for fixing said termination at a position which provides a maximum returned signal.

7. A method for positioning and fixing a termination of an optic fibre in a connection terminal, said method consisting in the steps of:
    inserting said termination in said terminal in a manner to allow said termination a transverse play inside said terminal,
    directing an optic signal onto an end face of said termination so as to be axially injected into a core of said fibre said optic signal travelling through said end face of said termination,
    detecting a signal returned by said same end face, at a point of this corresponding to a predetermined reference axis ($z_o$),
    transversely displacing said termination in said terminal with respect to said reference axis, in at least one direction, to a position in which a component of said detected signal representative of a position of said termination of said fibre passes through an extreme, so that this position corresponds to an alignment of an axis of said core of said fibre on said reference axis, and
    fixing said termination in this position in said terminal.

8. A method according to claim 7, in which further:

at the same time as said optic signal is injected, it is modulated in amplitude, and said detected optic signal is demodulated, in a manner to obtain a continuous measurement value representative of said amplitude of said signal returned through said fibre.

9. A method according to claim 7, in which said optic signal is modulated, but at least one transverse vibration having a component parallel to a direction of displacement, said vibration alternatingly extending and returning parallel to both said axis of said core and said reference axis.

10. A method according to claim 9, in which said optic signal is submitted to a double modulation by two simultaneous transverse vibrations, produced at two different frequencies, not harmonics of each other.

11. A method according to claim 8, in which said demodulation is a synchronous demodulation effected at a frequency of modulation of said optic signal.

12. A method according to claim 7, in which:

there is provided a preliminary stage consisting of fixing to a free end of said termination a ferrule of ferromagnetic material, and said termination is held and displaced by magnetic suspension of said ferrule by magnetic fields applied from outside said terminal.

13. A method according to claim 12, in which said magnetic suspension is controlled from the amplitude of said detected signal, in a manner to displace said termination in a direction producing an increase of this amplitude.

14. A method according to claim 7, in which said fixing of said termination in said terminal is produced by hardening of a glue filling said free space existing inside said terminal around said termination.

15. A method according to claim 14, in which said glue used is a glue of which said hardening is caused by an irradiation of ultra-violet light, said irradiation being triggered when said amplitude of said detected signal reaches its maximum value.

* * * * *

UNITED STATES PATENT AND TRADEMARK OFFICE
CERTIFICATE OF CORRECTION

PATENT NO. : 4,815,811

DATED : March 28, 1989

INVENTOR(S) : Jean-Jacques Crosnier; Michel de Mendez and Joel Maurin

It is certified that error appears in the above-identified patent and that said Letters Patent is hereby corrected as shown below:

On front page format at [73], the assignee should read --Souriau & Cie-- and not "Sourtau & Cie"

Signed and Sealed this

Twentieth Day of August, 1991

Attest:

HARRY F. MANBECK, JR.

Attesting Officer

Commissioner of Patents and Trademarks